United States Patent [19]

Mysson et al.

[11] Patent Number: 5,513,424
[45] Date of Patent: May 7, 1996

[54] METHOD FOR THE MANUFACTURE OF FOIL CAPACITORS

[75] Inventors: Philippe Mysson, Fontaine Francaise; Ronan Stephan, Dijon, both of France

[73] Assignee: Compagnie Europeene De Composants Electroniques LCC, Courbevoie, France

[21] Appl. No.: 389,968

[22] Filed: Feb. 15, 1995

Related U.S. Application Data

[63] Continuation of Ser. No. 86,087, Jul. 6, 1993, abandoned.

[30] Foreign Application Priority Data

Jul. 3, 1992 [FR] France .................. 92 08212

[51] Int. Cl.⁶ .................. H01G 4/18; H01G 4/232; H01G 4/33
[52] U.S. Cl. .................. 29/25.42; 361/323; 427/79
[58] Field of Search ............... 29/25.42, 415, 29/417; 427/79, 81; 228/37, 42, 219, 260; 361/323, 309, 301.5

[56] References Cited

U.S. PATENT DOCUMENTS

| | | | |
|---|---|---|---|
| 3,773,242 | 11/1973 | Fitzsimmons | 228/37 |
| 4,046,105 | 9/1977 | Gomez | 118/429 |
| 4,127,692 | 11/1978 | Boynton | 228/37 X |
| 4,162,034 | 7/1979 | Pavlas | 228/37 |
| 4,226,011 | 10/1980 | Hunt | 29/25.42 |
| 4,696,082 | 9/1987 | Fonfria et al. | 29/25.42 |
| 4,719,675 | 1/1988 | Savoia | 29/25.42 |
| 4,914,547 | 4/1990 | Toro et al. | 361/323 |
| 4,923,850 | 5/1990 | Stephan et al. | |
| 5,018,048 | 5/1991 | Shaw et al. | 29/25.42 X |
| 5,157,820 | 10/1992 | Frederick | 29/25.42 |

FOREIGN PATENT DOCUMENTS

| | | | |
|---|---|---|---|
| 0112229 | 6/1984 | European Pat. Off. | 29/25.42 |
| 0460998 | 12/1991 | European Pat. Off. | 29/25.42 |

*Primary Examiner*—Peter Vo
*Attorney, Agent, or Firm*—Pollock, Vande Sande & Priddy

[57] ABSTRACT

A method for the manufacture of foil capacitors with metallized plastic films, said method comprising the following steps:

coiling at least one pair of metallized plastic films so as to form the stacked structure of the capacitors;

metallizing the lateral faces of the coiled structure in order to create the plates of the capacitors;

cutting out the coiled and metallized structure, or parent capacitor, into semi-finished capacitors;

putting the semi-finished capacitors and their connection wires through a cleansing flux;

soldering the connection wires to the plates of the semi-finished capacitors;

wherein the soldering is done by wave soldering and wherein, between said metallization and said cutting, a heat treatment operation designed to give the plastic film the characteristics needed to withstand the wave soldering and a new metallization designed to ensure the mechanical and electrical quality of the connections are carried out successively.

10 Claims, 4 Drawing Sheets

METHOD FOR THE MANUFACTURE OF FOIL CAPACITORS

This application is a continuation of U.S. patent application Ser. No. 08/086,087, filed Jul. 6, 1993, now abandoned.

BACKGROUND OF THE INVENTION

The present invention relates to a method for the manufacture of foil capacitors made by the stacking of metallized plastic films as well as to the capacitor obtained by such a method.

As shown in FIG. 3, one of the steps of the method consists in the coiling or winding, on a large-diameter wheel S, of at least one pair of metallized plastic films F1 and F2. Each metallized plastic film takes the form of a strip cut from a large width of metallized plastic film. During this winding stage, a non-metallized side margin M1, M2 is made on each of the two films of the pair (FIG. 4). The non-metallized side margins are made on opposite sides in order to obtain a pair of films constituted by an even-order film and an odd-order film.

Thus, a capacitive strip comprising alternating even-order and odd-order layers, called a parent capacitor is obtained and is shown in front and side elevations in FIGS. 5 and 6. Each of the lateral faces L of the capacitive strip is then covered with a metal or an alloy in order to make output plates. Each output plate enables the metallizations of the same-order layers to be connected to one another mechanically and electrically. This operation, which is achieved by the spraying of molten metal, is known as Schooping or Schoop's metal process. To obtain more efficient clinging of the drops of molten metal to the same-order films, it is recommended that the even-order films should be offset with respect to the odd-order films as shown at d.

As shown in FIG. 7, the parent capacitor is then cut out along lines D1 and D2 into elementary blocks shown in FIG. 8. Each capacitor constitutes a foil capacitor with a generally parallelepiped shape comprising two metallized lateral faces that constitute the plates as shown in FIG. 8.

Then comes the step of soldering the connections to each of the plates of the capacitor.

According to the prior art, the technique of soldering to plastic film capacitors uses the process of reflow, by electric arc or laser beam, of a tin-lead alloy deposited by Schooping on the film capacitor. In melting through the energy provided, the tin-lead alloy ensures quality of the electrical contact and the mechanical behavior (i.e. characteristics of strength and resistance) of the connections on the capacitor.

The capacitor is then encapsulated in a pack by means of a thermosetting resin or is covered with epoxy resin by the so-called fluidized bath method.

The soldering technique described here above has several drawbacks:

it requires the bringing together of two electrodes of the parts to be connected, thus restricting the work rate;

it calls for frequent operations to clean said electrodes so that a minimum quality of solder joint is maintained.

According to the prior art soldering method, it is difficult to obtain high-quality mechanical behavior for the connections. The low-quality mechanical behavior of the connections then results in poor electrical contact which causes deterioration in the loss angle of the capacitors.

These drawbacks arise chiefly out of the fact that the reflow of the alloy deposited on the two sides of the plastic film capacitor is only localized and corresponds to the dimension of the electrode or of the laser beam.

The invention does not have these drawbacks.

SUMMARY OF THE INVENTION

An object of the invention is a method for the manufacture of foil capacitors made by the stacking of metallized plastic films, said method comprising the following steps:

coiling at least one pair of metallized plastic films so as to form the stacked structure of the capacitors;

metallizing the lateral faces of the coiled structure in order to create the plates of the capacitors;

cutting out the coiled and metallized structure, or parent capacitor, into semi-finished capacitors;

putting the semi-finished capacitors and their connection wires through a cleansing flux;

soldering the connection wires to the plates of the semi-finished capacitors;

wherein the soldering is done by wave soldering and wherein, between said metallization and said cutting, a heat treatment operation designed to give the plastic film the characteristics needed to withstand the wave soldering and a new metallization designed to ensure the mechanical and electrical quality of the connections are carried out successively.

One advantage of the invention, therefore, is that it enables the manufacture of capacitors with an excellent level of mechanical behavior and, consequently, excellent electrical contact between the connections and the plates.

BRIEF DESCRIPTION OF THE FIGURES

FIG. 2b is an elevational view of an aperture existing in the distribution path of FIG. 2a.

MORE DETAILED DESCRIPTION

Other characteristics and advantages of the invention will appear from a preferred embodiment, made with reference to the appended drawings.

According to the invention, the parent capacitor undergoes a heat treatment after the step of metallization by Schooping of the lateral faces. This heat treatment is designed to give the plastic film the characteristics needed to withstand the wave soldering.

The metal that is deposited by Schooping, for example, aluminum, is chosen so that it withstands the heat treatment and does not get oxidized.

The heat treatment consists of taking the capacitors to 170° Celsius for about one hour.

According to the invention, Schooping is used to spray another metal, for example, copper, after the heat treatment. This new step of metallization by Schooping, with copper or any other metal having good wettability characteristics, is done so as to ensure the mechanical and electrical quality of the connection that is to be made.

The parent capacitor is then cut into elementary capacitors having their plates constituted by the two metal layers mentioned here above. Each plate can then be connected to a connection wire designed, for example, to enable it to be mounted on a printed circuit.

Figure 1:
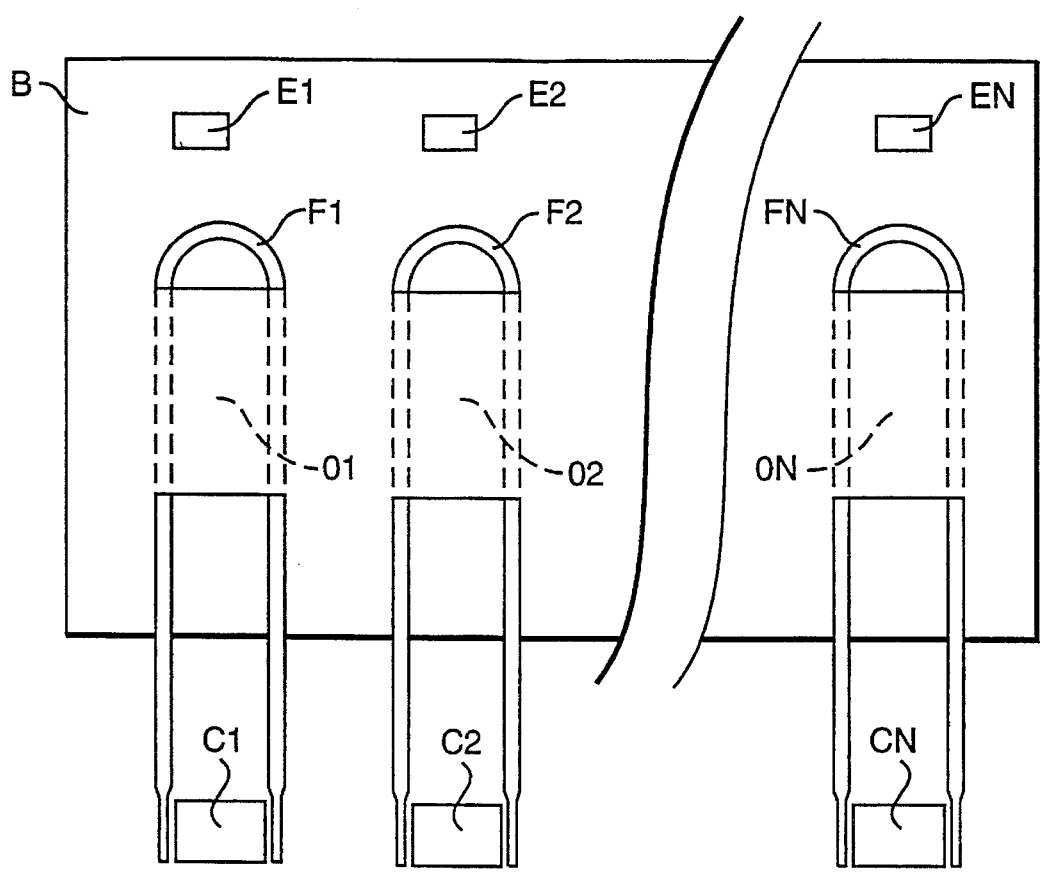
FIG. 1 is a top plan view of a continuous carrier band to which capacitors, in accordance with the present invention, are connected.
Figure 3:
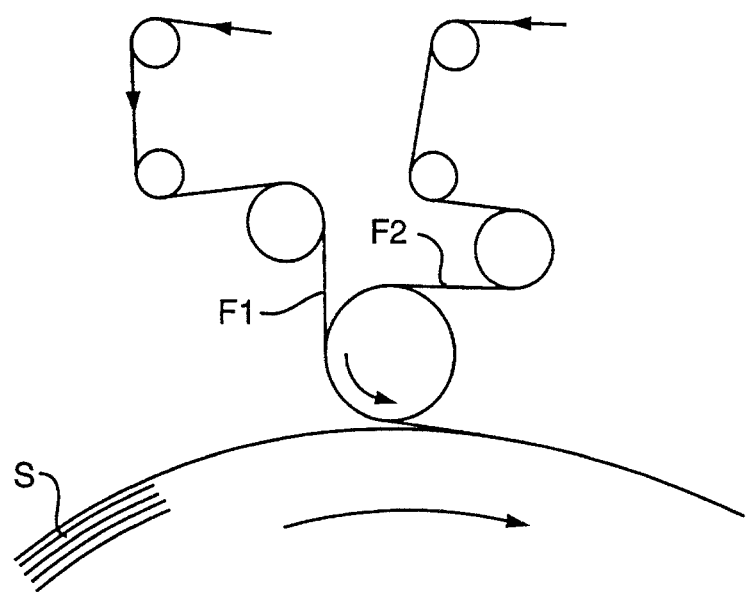
FIG. 3 is a schematic illustration of a pair of plastic films (F1, F2) wound in overlapping relationship to form a coiled stack(s).

In a first stage, each capacitor is placed between the two ends of a connection wire arranged beforehand in the form of a loop as shown in FIG. 1.

In FIG. 1, according to the preferred embodiment, a continuous carrier band B supports N connection wires F1, F2 ..., FN. Each wire Fi is held on the band B by any known mechanical means, for example by means of an aperture Oi (i=1,2, ..., N) made in said band. Each wire Fi holds a capacitor Ci by pressure between its two ends, which are flattened beforehand in order that said pressure exerted on the plates may be uniformly distributed.

The capacitors are inserted between the ends of the wires by any means known to those skilled in the art, for example, by means of a suction pipette system.

The carrier band B may include notches E1, E2, ..., EN which enables it to be held on any driving device, whether automatic or not.

The capacitors thus positioned are then passed into a cleansing flux, for example, a foaming solder flux without residue, so as to remove the need for the cleansing operation made necessary by the resinous fluxes.

Advantageously, according to the invention, there may then be a phase of local pre-heating of the contacts between wires and plates in order to activate the flux and condition the capacitor for the next step which is that of putting the component through a soldering alloy wave.

According to the invention, the nozzle that generates the solder wave is adapted to the shape and size of the components.

Figure 2A:
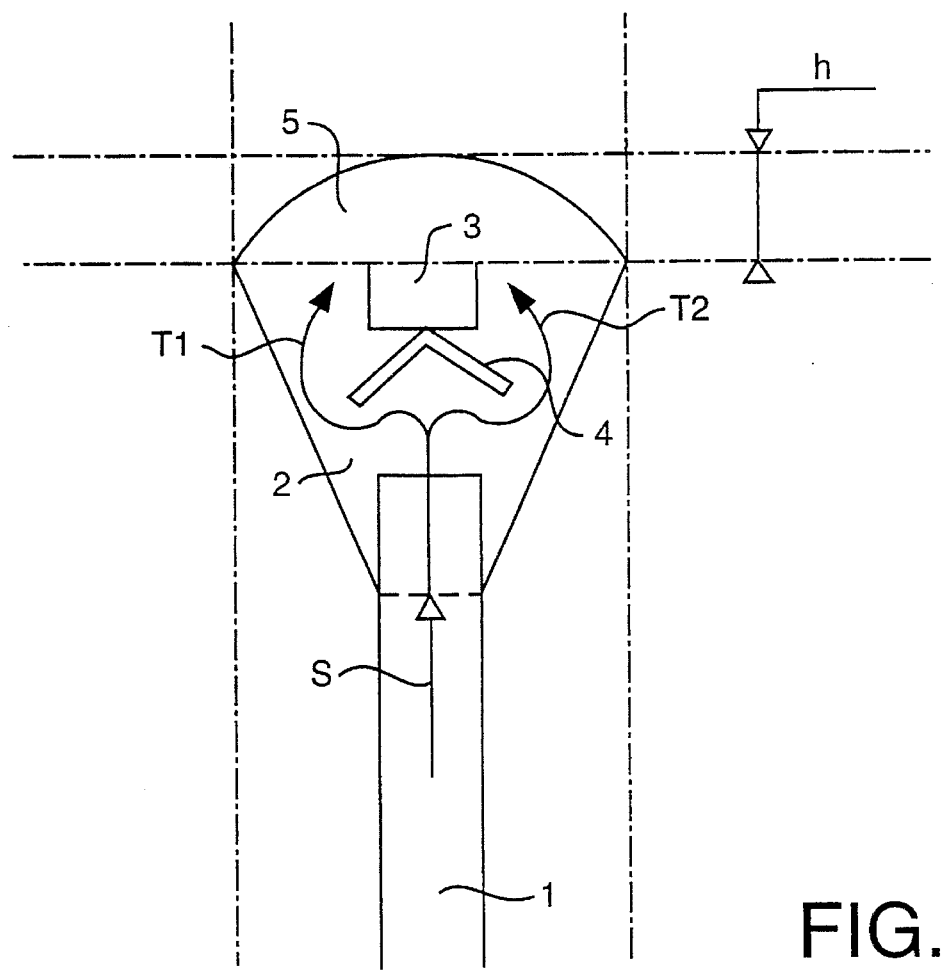
FIG. 2a is a diagrammatic view of a solder distribution path as employed in the present invention.
Figure 2B:
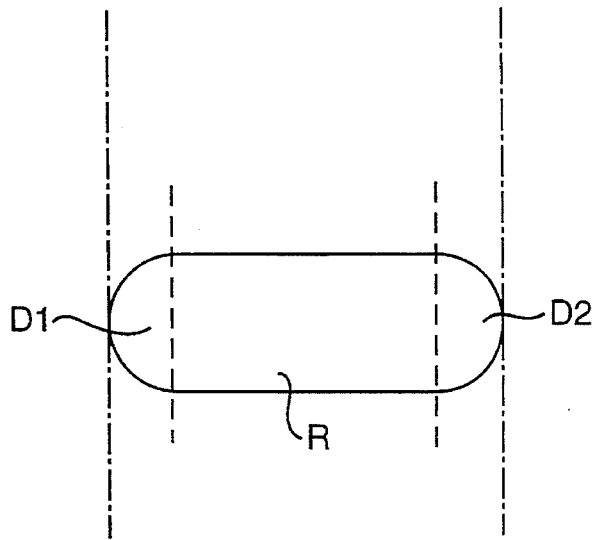
Figure 4:
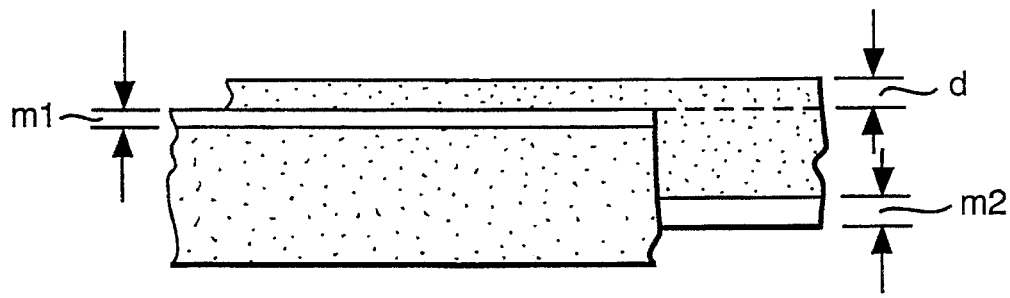
FIG. 4 shows a top plan view of the two films as they are wound with non-metallized side margins and an offset between layers.
Figure 7:
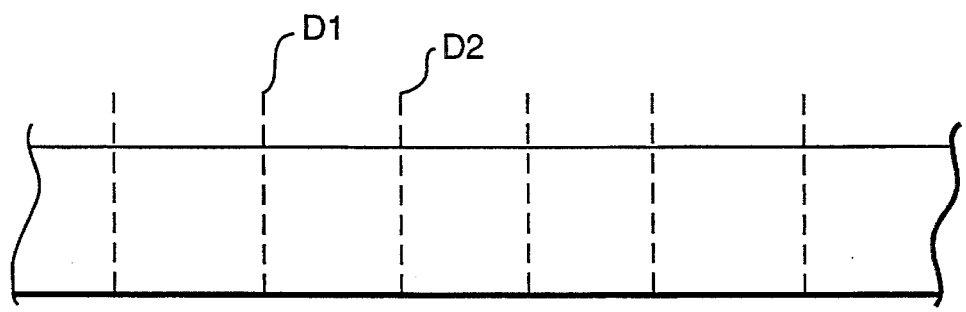
FIG. 7 illustrates the direction of cutting the stack to form capacitor units. Cutting lines D1, D2, are positioned perpendicular to the metallized lateral faces of the stack.
Figure 8:
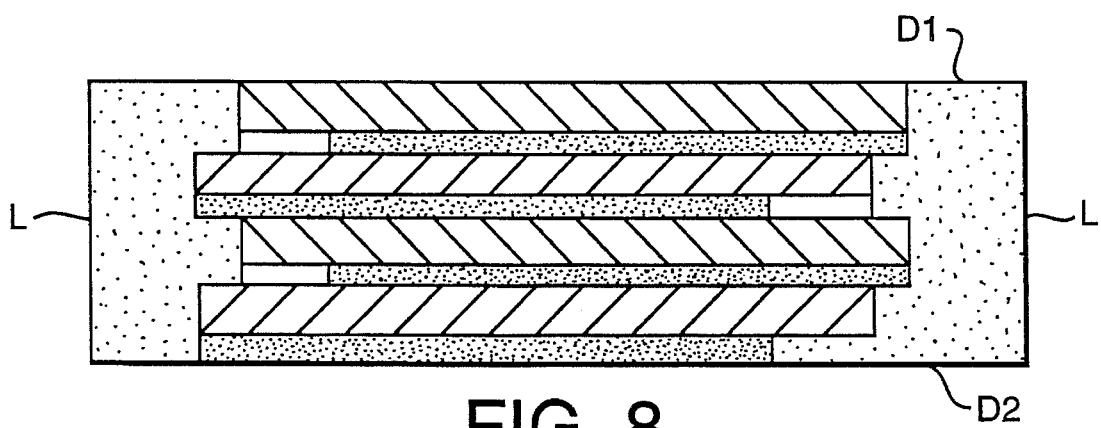
FIG. 8 is a cross-sectional view of a semi-finished capacitor after the lateral faces have been metallized.
Figure 6:
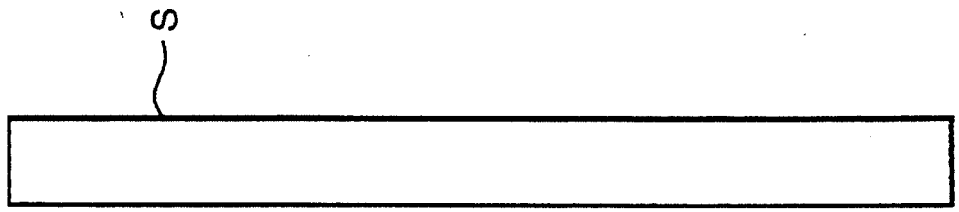
FIG. 6 indicates a side elevational view of the coiled stack(s) shown in FIG. 3.
Figure 5:
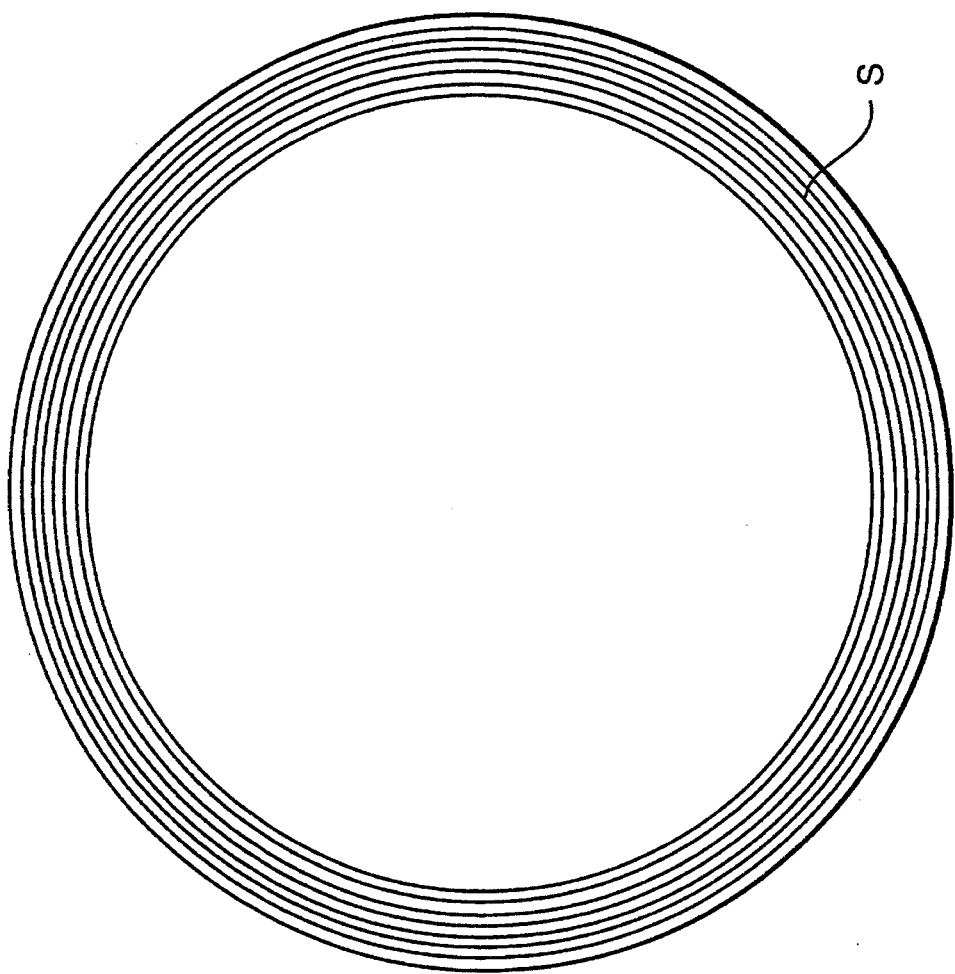
FIG. 5 depicts a front elevational view of a resulting coiled stack(s).

Thus, according to the preferred embodiment shown in FIG. 2a, the nozzle is constituted by a tube opening into an aperture 2 that is fixed to said tube and flared to permit the removal of the solder. The surface defined by the flaring of the aperture 2 is shown in FIG. 2b. It is constituted by a rectangle R, the two small sides of which are extended by two half disks D1 and D2.

The path travelled by the solder is shown in FIG. 2a. The solder S rises in the tube 1. A deflector 4, fixedly joined to the illustrated cone, can be used to reduce the variations in solder flow rate by splitting its path into two paths (arrows T1 and T2). The solder then gets discharged through two notches 3 located in the upper part of the aperture of the nozzle. The two notches 3 are located at the center of the two large sides of the rectangle R defined in FIG. 2b. Before getting discharged, the solder, as is known to those skilled in the art, has a bulging portion 5 with a height h in its central part.

The solder of the components is done by plunging the capacitors and their connections into the central part of said bulging portion.

Since the height h of the bulging portion of the solder is guaranteed with precision by means of the nozzle, one advantage of the invention is that it enables the different capacitors to be soldered with excellent reproducibility. According to the preferred embodiment, the molten alloy that constitutes the molten alloy is formed by 60% tin and 40% lead. Its temperature is 205° C. However, any other alloy with a low melting point, i.e. a melting point located approximately between 180° Celsius and 190° Celsius, may be used. This is the case, for example, with the alloy constituted by 62% tin, 36% lead and 2% silver.

As specified earlier, the method can be automated. The rates obtained may then be very high for it is sufficient that the period of time during which each component passes through the solder bath should be less than one second to obtain a proper solder joint.

What is claimed is:

1. A method for making foil capacitors comprising the steps:

coiling at least one pair of metallized plastic film foils on a large diameter wheel to form a metallized stack having axially separated planar lateral parallel faces;

metallizing the lateral parallel faces of the stack with a first metal;

subjecting the stack to a heat-treatment occurring at approximately 170° C. for approximately one hour for elevating the melting point of the plastic film;

metallizing the lateral parallel faces of the stack with a second metal having good wettability characteristics, the first and second metals constituting the plates of said foil capacitor;

cutting the metallized stack at spaced points in a direction perpendicular to the planes of the lateral parallel faces;

mounting connections to the plates of said foil capacitors;

subjecting said foil capacitors to cleaning flux;

wave-soldering the connections to the plates of said foil capacitors, said wave-soldering occurring with a molten alloy being 60% tin and 40% lead and whose temperature is 205° C.

2. A method as claimed in claim 1, wherein the cleaning flux is a foaming solder flux without residue.

3. A method as claimed in claim 1, wherein the foil capacitors and the connections mounted to the capacitor plates undergo preheating after being subjected to the cleaning flux.

4. A method as claimed in claim 1, wherein a nozzle is used to wave solder so as to reduce flow rate variations of a solder wave, and to guarantee a quantity of solder that is substantially constant for each of the foil capacitors to be soldered.

5. A method as claimed in claim 1, wherein the first metal is aluminum and wherein the second metal is copper.

6. A method for making foil capacitors comprising the steps:

coiling at least one pair of metallized plastic film foils on a large diameter wheel to form a metallized stack having axially separated planar lateral parallel faces;

metallizing the lateral parallel faces of the stack with a first metal;

subjecting the stack to a heat-treatment occurring at approximately 170° C. for approximately one hour for elevating the melting point of the plastic film;

metallizing the lateral parallel faces of the stack with a second metal having good wettability characteristics, the first and second metals constituting the plates of said foil capacitor;

cutting the metallized stack at spaced points in a direction perpendicular to the planes of the lateral parallel faces;

mounting connections to the plates of said foil capacitors;

subjecting said foil capacitors to cleaning flux;

wave-soldering the connections to the plates of said foil capacitors, said wave-soldering occurring with a molten alloy whose temperature is maintained between 180° C. and 190° C.

7. A method as claimed in claim 6, wherein the cleaning flux is a foaming solder flux without residue.

8. A method as claimed in claim 6, wherein the foil capacitors and the connections mounted to the capacitor plates undergo preheating after being subjected to the cleaning flux.

9. A method as claimed in claim 6, wherein a nozzle is used to wave solder so as to reduce flow rate variations of a solder wave, and to guarantee a quantity of solder that is substantially constant for each of the foil capacitors to be soldered.

10. A method as claimed in claim 6, wherein the first metal is aluminum and wherein the second metal is copper.

* * * * *